United States Patent [19]

Bikson et al.

[11] Patent Number: 5,181,940
[45] Date of Patent: Jan. 26, 1993

[54] HOLLOW FIBER MEMBRANES

[75] Inventors: Benjamin Bikson, Brookline; James T. Macheras, Quincy; Joyce K. Nelson, Lexington, all of Mass.

[73] Assignee: Union Carbide Industrial Gases Technology Corporation, Danbury, Conn.

[21] Appl. No.: 739,322

[22] Filed: Aug. 1, 1991

[51] Int. Cl.$^5$ ............... B01D 53/22; B01D 69/08; D01D 5/24
[52] U.S. Cl. .................................. 55/16; 55/68; 55/158; 264/41; 264/177.17; 264/178 F; 264/211.14
[58] Field of Search ............... 55/16, 68, 158; 264/41, 264/178 F, 177.17, 211.14

[56] References Cited

U.S. PATENT DOCUMENTS

| | | | |
|---|---|---|---|
| 4,744,932 | 5/1988 | Browne | 264/41 |
| 4,800,049 | 1/1989 | Gras | 264/41 X |
| 4,820,460 | 4/1989 | Repetti et al. | 264/41 |
| 4,915,886 | 4/1990 | Repetti et al. | 264/41 |
| 4,955,993 | 9/1990 | Sanders, Jr. et al. | 264/41 X |
| 4,992,221 | 2/1991 | Malon et al. | 264/41 |

*Primary Examiner*—Robert Spitzer
*Attorney, Agent, or Firm*—Alvin H. Fritschler

[57] ABSTRACT

A process for producing highly asymmetric hollow fibers useful as permselective gas separation membranes and for producing composite membranes thereof by extruding the spinning dope through a tube-in-orifice spinneret into a gas-filled chamber maintained at reduced pressure and then conveying the extruded hollow fiber through a liquid bath to solidify the extrudate.

51 Claims, No Drawings

HOLLOW FIBER MEMBRANES

FIELD OF THE INVENTION

This invention concerns methods of fabricating permselective membranes suitable for the separation of components of gas mixtures. The methods of this invention can be used to produce integrally skinned highly asymmetric hollow fiber membranes and highly asymmetric substrates useful for composite membrane preparation. In one embodiment, the fabricated membrane can be in the form of an integrally skinned asymmetric hollow fiber with a separation layer on its external surface or adjacent to it having the capacity for separating components of gas mixture under conditions of applied differential pressure. In another embodiment the invention comprises a composite hollow fiber membrane manufactured by depositing a thin separation layer on a highly asymmetric hollow fiber substrate, the composite membrane is capable of separating under applied differential pressure at least one gaseous component from a mixture of gases.

It was found that the asymmetric and composite hollow fiber membranes produced by the methods of this invention are characterized by improved combination of permeation rates and separation capabilities than are hollow fibers produced from the same materials by the processes heretofore used.

BACKGROUND OF THE INVENTION

This invention relates to an improved method of forming integral asymmetric membranes having ultrathin separation layers.

Loeb and Sourrrajan in U.S. Pat. No. 3,133,132 were first to disclose a method for preparing integrally asymmetric cellulose acetate membranes for desalination of water. The principle of membrane formation disclosed by Loeb and Sourirajan, frequently called the "phase inversion method" has been since extended to include a variety of polymers and separation processes.

The procedure for preparing asymmetric ("skinned") membranes from polymer solutions by phase inversion methods usually comprises the following stages: (1) casting the polymer solution, (2) exposure of the cast solution to air, (3) precipitation of the solution in coagulation media and leaching out solvents, and (4) the optional step of annealing the membrane. Although preparation of asymmetric membranes by direct coagulation without the evaporation step is known, most industrial procedures do include step 2 as a part of asymmetric membrane preparation. The importance of the evaporation step, although well recognized in the art, is highly empirical with optimal parameters such as evaporation temperature, duration of the evaporation step, etc. being determined experimentally for a particular polymer/solvent casting composition. For example, in U.S. Pat. No. 3,724,672, R. L. Leonard and J. D. Bashaw describe preparation of asymmetric hollow fiber membranes for reverse osmosis operations from esters of cellulose by extruding filaments into a controlled evaporation zone then directing the filaments into a cold water coagulation bath following by washing and annealing. Subsequently the use of asymmetric membranes has been extended from liquid-based separations such as reverse osmosis and ultrafiltration to gas separations. Examples of asymmetric membranes for gas separations prepared by phase inversion methods can be found in U.S. Pat. No. 4,944,775; 4,080,744; 4,681,605; and 4,880,441.

Manufacturing of integral asymmetric membranes for gas separations is significantly more difficult than for liquid separations. While the presence of small pores in the membrane can be tolerated or even desired in liquid separations such as desalination, the exceedingly small dimensions of gas molecules combined with low cohesive forces of gases make the presence of even Angstrom size pores in the separation layer unacceptable in gas separations. On the other hand, to achieve high permeability it is essential that the separation layer be kept as thin as possible, since the gas flux is inversely proportional to the membrane thickness. These two diametrically opposed requirements make the manufacturing of asymmetric gas separation membranes exceedingly difficult.

Though the manufacture of essentially defect-free ultrahigh flux asymmetric membranes is known in the art, for example, U.S. Pat. No. 4,902,422 and 4,772,392, it is known to be excessively difficult. Thus it is common in the art to subject gas separation membranes to treatments that effectively eliminate defects that may be present in ultrathin membrane separation layers.

Henis and Tripodi in U.S. Pat. No. 4,230,463 have addressed the presence of defects in asymmetric gas separation membranes by applying a coating. The multicomponent membranes produced by this coating process typically comprise a silicone rubber coating on the surface of an asymmetric membrane made of a glassy polymer. Additional defect-repair methods can be found in U.S. Pat. Nos. 4,877,528; 4,746,333 and 4,776,936.

To attain high levels of gas productivity, membranes have to be prepared with separation layers as thin as possible, preferably below 500 Å. Recently, Kesting et al. in U.S. Pat. No. 4,871,494 have disclosed preparation of high productivity asymmetric membranes with graded density skins. The membranes are formed from casting solutions comprised of a Lewis acid-base complex-solvent system close to the point of incipient gelation.

A different class of gas separation membranes is produced by depositing a thin separation layer on a porous support wherein the material of the deposited layer determines the gas separation characteristics of the overall structure. These composite membranes are sometimes more advantageous since they allow decoupling of the material requirements for a particular gas separation application from engineering design requirements of the porous support. A variety of separation layer materials, support structures and composite membrane manufacturing methods are known in the art. Examples of composite gas separation membranes can be found in U.S. Pat. Nos. 4,243,701; 3,980,456; 4,602,922 and 4,881,954.

It is further known in the art that advanced performance composite membranes are frequently prepared by depositing ultrathin separation layers on support surfaces of uniform porosity (e.g., sharp pore size distribution) and of pore diameter below 1000 Å. Highly asymmetric substrates can frequently provide such advantageous supports.

Procedures for dry-wet spinning of hollow fibers are well known in the art, see for example, I. Cabasso, "Hollow Fiber Membranes", Kirk-Othmer, Enc. of Chem. Tech., 12, Third Ed., 492-518 (1980) and I.

Cabasso, "Membranes", Enc. of Pol. Sci. and Eng., 9, Second Ed., 509-579 (1987).

The vast body of knowledge that exists in the field of fiber spinning is also frequently directly applicable and indeed is used extensively in the field of spinning hollow fiber membranes. For example, information on the dry-jet wet-spinning process and the equipment for manufacturing polyamide fibers disclosed in U.S. Pat. No. 3,767,756 can be useful for spinning hollow fiber membranes.

A procedure for preparing fibers from polymer solutions at subatmospheric pressure is disclosed in U.S. Pat. No. 3,842,151 issued Oct. 15, 1974 to Stoy et al. Though the disclosure relates to a method and apparatus for forming fibers, strings, cords, tubings, films, etc., its basic disclosure is directed to the preparation of solid fibers. According to the invention disclosed, a polymer solution is extruded through a spinneret into a tube or shaft whose upper end is sealed against gas flow by a lid connected with the spinneret, and its lower end is placed below the level of a coagulation bath open to the atmosphere. The pressure within the tube between the spinneret and the level of the coagulation bath is maintained lower than the pressure outside the tube or shaft so that the level of the coagulation liquid is higher in the shaft than in the outer coagulation bath. In the spinning process, the polymer solution exits the spinneret into the gaseous atmosphere above the coagulation bath in the shaft, which is maintained at subatmospheric pressure, the fibers then enter the coagulation bath and after passing through the bath are collected. Vacuum means are provided to maintain the level of the coagulation bath at the desired height and provision is also made to introduce and remove gaseous medium from the shaft area between the spinneret and the top of the coagulation bath if desired.

BRIEF SUMMARY OF THE INVENTION

This invention pertains to a process for producing highly asymmetric hollow fiber membranes for gas separations by extruding the spinning dope into a zone that is maintained at reduced pressure as compared to the exterior of the spinning chamber and then conveying the extruded hollow fiber through a coagulation bath. The spinneret used to produce the asymmetric hollow fibers is enclosed in a chamber at subatmospheric pressure. The hollow fiber extrudate passes through the zone of reduced pressure prior to the phase separation and solidification step.

DETAILED DESCRIPTION OF THE INVENTION

The procedure for preparing structured ("skinned" or asymmetric) membranes from polymer solutions by the phase inversion method may be divided into the following major stages: (1) casting the polymer solution, (2) exposure of the cast polymer solution to air (or controlled evaporation zone in general), (3) precipitation of the solution in a coagulation media and leaching out the solvent (frequently includes leaching of the nonsolvents, pore forming agents and other additives as well) and the optional step, (4) annealing the membrane. The objective is to produce an asymmetric structure in the precipitated film consisting of a thin, relatively dense skin supported by a thick, more porous sublayer, since such morphologies impart high permselectivity in combination with high permeability. Various mechanisms have been suggested for explaining skin formation. The mechanisms are essentially based upon the same fundamental assumption, namely, that the density of each layer of the membrane is determined by the concentration of the polymer solution at precipitation. This means that a dense skin forms when the polymer precipitates from a highly concentrated solution, whereas a porous substructure results from precipitation from a dilute solution. The evaporation step is considered to be important in the asymmetric structure formation since during the evaporation step solvent leaves the casting film and the polymer concentration increases near the air-film interface. During the quench step, solvent-nonsolvent exchange takes place; when the concentration reaches a certain level, precipitation and porous structure formation takes place with the polymer-rich phase establishing the solid region and the polymer-lean phase, the pores. An additional step is sometimes included in the final asymmetric structure formation wherein the formed membrane is annealed to densify the structure.

This invention provides a significant improvement in the field of spinning hollow fiber membranes to be used in the separation of gaseous or vapor mixtures. Specifically, the improvement involves the spinning of hollow fibers at subatmospheric pressure, i.e., a vacuum. The fibers described in this invention are all produced by a dry-wet spinning process; that is, the spinneret is positioned some distance above a coagulation bath so that the hollow fiber extrudate travels through a gaseous or air space before entering the coagulation bath. This space or zone through which the fiber travels before entering the coagulation bath is referred to as the gap and the gas in the gap may be air or any other suitable gas. It is the essence of this process that this gap be at some reduced pressure or vacuum relative to ambient atmospheric pressure to produce the hollow fiber membranes in accordance with this invention.

It was found presently that when in the process of hollow fiber spinning the cast polymer solution is exposed to a reduced pressure zone prior to the solidification step, an unexpected significantly higher level of asymmetry in hollow fiber morphology is attained. The increase in asymmetry is typically manifested by higher fast gas permeation rates without compromise in gas separation factors. The increase in the fast gas permeation rate typically indicates a substantial decrease in the thickness of the separation barrier layer. The thickness of the separation barrier layer of the asymmetric membranes produced by the method of this invention is frequently less than 1,000 Ångstroms and typically below 500 Ångstroms. The thickness of the separation barrier layer can often be estimated from electron scanning microscopy measurements, an additional useful method is the oxygen plasma ablastion technique described by A. K. Fritzche et al. in the Journal of Applied Polymer Science, V40, Pg. 19-40, 1990. The mechanism for substantial improvements in gas permeation characteristics of hollow fiber membranes prepared by methods of this invention is not completely understood. It is assumed, however, that the exposure of the cast polymer solution to a reduced pressure prior to the Phase separation step induces high levels of density gradient in the cast solution through rapid evaporation of the solvent from the surface. Apparently, higher levels of density gradient between the surface layer and the internal membrane layers can be attained under these conditions than was feasible by the methods of prior art. It was further noted that the extrudate emerging from the spinneret tends to balloon when entering the reduced pressure zone due to the pressure differential between the bore side and exterior of the hollow fiber. The ballooning effect tends to increase fiber outside diameter significantly more than the conventional die swelling that takes place during fiber extrusion. The fiber is drawn down to the desired final dimensions prior to solidification by phase separation. The surface area available for evaporation and molecular orientation in surface layers of hollow fibers spun through a zone of reduced pressure can thus be significantly different than those spun conventionally through a zone with a normal atmospheric pressure in addition to differences in evaporation conditions.

The method of this invention can be advantageously utilized to produce flat sheet and tubular membranes, but it is particularly useful for manufacturing hollow fibers. In producing the asymmetric porous hollow fibers by this invention a solution of the fiber-forming material is prepared, commonly referred to as a sol, a spinning dope or spinning solution. The sol comprises the polymer mixed with a vehicle comprised of one or more components to yield a mixture with a viscosity suitable for the spinning of hollow fibers. The vehicle with which the polymer is mixed usually consists of at least one solvent capable of dissolving the polymer along with one or more additives that may be nonsolvents, as is well known in the art. The hollow fibers are prepared by spinning polymeric solutions or sols that are close to the point of incipient gelation or gels through a zone of reduced partial pressure followed by solidification in coagulation media. Advantageously the sols are prepared by dissolving one or more polymers in a solvent system that would contain at least one additive such as a nonsolvent, a pore-forming agent, or a surfactant.

The spinning solution may contain solvent or nonsolvent components of high vapor pressure to promote solvent evaporation in reduced pressure gap. In some instances, it may be beneficial to have a mixture of high boiling and low boiling solvents as a part of the spinning solution. However, it was noted that the process of this invention does not require the incorporation of low temperature boiling solvents into the spinning solution to attain high levels of fiber asymmetry, and solutions comprised of high boiling solvents only can be utilized effectively. The advantages of the present invention were found to be significant for hollow fibers spun from some polymer/solvent combinations while they were less beneficial in others. The reasons for these differences are not well understood.

The fiber solidification step is typically carried out in a coagulation media that is comprised of a nonsolvent or solvent/nonsolvent combination. It is desirable that the solvent component of the vehicle be miscible with the coagulation media used in the spinning process. Thus if the coagulation media is aqueous in nature, then water miscible solvents such as dimethyl formamide, N-methyl pyrrolidone, tetrahydrofuran, etc., may be used as a solvent component of the vehicle. Advantageously the precipitation media is water. However, it is well known in the art that the phase inversion step that leads to the formation of a porous structure can be, in some cases, induced by a rapid cooling of the casting solution to induce a thermal phase separation. Furthermore, under some conditions, a combination of thermally induced and nonsolvent induced phase separation can take place simultaneously during the phase inversion step. It is understood that all these processes are included in the scope of the present invention.

The nonsolvent components used in formulating the sol can be solids or liquids. These components are useful in controlling the viscosity of the spinning dope as well as the porosity and other properties of hollow fibers prepared from the sol. Typical of the liquid nonsolvents that are known to be useful in formulating spin dopes are aliphatic alcohols, particularly polyhydric alcohols, such as ethylene glycol, glycerine, etc. polyethylene oxides and polypropylene oxides, surfactants such as alkylaryl polyether alcohols, alkylaryl sulfonates, alkyl sulfates, etc., triethylphosphate, formamide, aliphatic acids, such as acetic or propionic acid, etc. Solid materials known to be useful as nonsolvents are polyvinylpyrrolidone, citric acid, and salts, such as zinc chloride, lithium chloride, etc.

The spinning dope should have a viscosity high enough to provide adequate strength to the hollow fiber precursor as it is extruded from the spinneret into the gap. The viscosity of the dope at the extrusion temperature should be about 1,000 to 10,000,000 centipoise, preferably about 10,000 to 1,000,000 centipoise.

The spinning dope can be prepared by first adding the solvent components of the vehicle to a suitable mixing vessel and subsequently adding the nonsolvent components and stirring until a homogeneous mixture is obtained. The fiber-forming polymer may then be added to this vehicle and mixed for a sufficient time to completely dissolve the polymer. It is advantageous to use a mechanical stirring device capable of mixing the resulting viscous mixture. Mixing of representative spinning dopes may be accomplished in less than 24 hours, often in about 8 hours.

Following the completion of the mixing process, the spinning dope must be deaerated; that is, any bubbles that have been entrained in the dope during the mixing cycle must be removed prior to spinning the dope into hollow fibers. This step must be taken so that large defects in the porous hollow fiber are not formed by air bubbles causing disturbances in the hollow fiber extrusion process. Deaeration may be accomplished by subjecting the spinning dope to a vacuum in a suitable vessel or by other methods well known in the art.

Prior to being delivered to the spinneret, it is beneficial for the dope to undergo one or more filtration steps. It is desirable to remove any contaminants from the spinning dope in order to prevent flow disruptions at the spinneret, as well as prevent large defects in the porous hollow fiber that may lead to poor mechanical properties or decreased separation efficiency. Filters with a nominal pore size rating of about 100 microns are useful for this process, although filters with nominal pore size ratings down to 20 microns or 10 microns may be preferred in some instances.

Spinnerets for use in this invention are generally of the tube-in-orifice type, in which there is a provision for a core fluid such as liquid or gas to be metered through the tube to produce the bore in the hollow fiber, but other spinneret designs can also be used; multi-orifice spinnerets can be used. The orifice diameters for spinnerets used in this invention may be in the range of about 0.0254 cm to 0.51 cm, preferably about 0.05 cm to about 0.25 cm. As is known and recognized, the spinneret sizes will depend to a great extent on the desired hollow fiber dimensions.

The tube in the spinneret should be positioned in the center of the orifice of the spinneret in order to maintain concentricity of the resulting fiber. In addition, the bore of the spinneret tube should be large enough to permit sufficient flow of the bore fluid to yield a fiber of the required size. The outer diameter of the spinneret tube should be in the range of about 0.005 cm to about 0.25 cm, preferably about 0.013 to about 0.2 cm.

The spinning dope can be delivered to the spinneret by any means known in the art that will provide a consistent flow at the desired rate. Representative of methods used for spinning dope delivery is to force the material from a vessel to the spinneret under gas pressure while metering the flow with a suitable regulating valve and rotameter assembly. Alternatively, a pump may be employed to meter the dope to the spinneret. Another method would be to employ a combination of pressure vessels and pumps to accomplish this task. Typical flow rates for dope delivered to the spinneret in practicing this invention are in the range of 0.5 cc/minute to 20 cc/minute, preferably from 1 cc/minute to 10 cc/minute. However, this is dependent upon the size of the spinneret and number and size of the orifices.

Spin stretch factors as low as about 1 or lower and as high as about 30 or more can be used. The spin stretch factor (SSF), as expressed herein, is the ratio of the velocity of the fiber as it leaves the coagulation bath to the jet velocity. The jet velocity is the average velocity of the dope in the spinneret capillary as calculated from the volume of the dope passing through an orifice per unit time and from the cross-sectional area of the orifice.

It may often be advantageous to heat the spinning dope prior to extrusion from the spinneret. This may be useful sometimes from the point of view of reducing the viscosity of the spinning dope to make it easier to handle. In addition, in some instances asymmetric porous hollow fiber with more beneficial properties may be obtained by delivering the spinning dope at elevated temperatures. Dope temperatures at the spinneret are frequently in the range of from about 20° C. to 200° C., preferably from about 30° C. to 150° C.

In order to maintain an open bore in the extruded spinning dope stream, a core fluid is delivered through the tube in the spinneret. This core fluid may be liquid or gaseous and may consist of a single component or a mixture of components. The core fluid is delivered to the spinneret tube at a rate that will yield a fiber of the desired size. The flow rate of liquid bore fluids metered to the spinneret may be measured by means of any known suitable device, such as a flowmeter. These bore fluids may be delivered to the spinneret by means of a metering pump or alternatively by forcing the liquid from a vessel by means of gas pressure. Gaseous bore fluids may be delivered by using a metered compressed gas. Alternately, one can take advantage of the pressure differential between the bore of the spinneret tube and subatmospheric pressure in the chamber that encases the spinneret to aspirate the core fluid into the spinneret.

It may often be advantageous to control the temperature of the core fluid to achieve particular asymmetric hollow fiber characteristics. The temperature of the core fluid is frequently from about 0° C.–200° C., and more frequently from about 20° C.–100° C.

As the hollow fiber precursor consisting essentially of the combined spinning dope and core fluid streams is extruded from the spinneret, it is essential in this invention to have the spinneret positioned some distance above the coagulation bath. This is done to expose the hollow fiber precursor for a period of time to reduced pressure in the vacuum chamber or gap prior to the solidification step. It is the exposure of the hollow fiber stream to the reduced pressure in the gap that gives the hollow fibers of this invention their improved properties over fibers spun at otherwise similar conditions but at an atmospheric pressure. The length of this gap can be from about 0.25 cm to about two meters, generally and preferably from about 0.5 cm to about 30 cm. The vacuum level in the chamber will vary from about 1 cm to about 75 cm Hg, frequently from about 10 cm Hg to about 36 cm Hg. The vacuum should not be maintained too high so as to cause rupture of the hollow fibers as they pass through the vacuum chamber or an undue evaporation of the coagulation fluid.

Following extrusion of the liquid hollow fiber stream through the gap, it is then run through one or more coagulation baths, which serve to solidify the extrudate and help the hollow fiber maintain its shape. The coagulation baths may consist of one or more components that are miscible with the solvent components of the spinning dope. The residence time in the coagulation baths should be long enough to permit sufficient diffusion of solvent out of the fiber and sufficient diffusion of coagulant into the fiber so that an integral structure is achieved in the fiber prior to take-up. The coagulation media may consist of any liquid or solution of several components that will conveniently coagulate or precipitate the dope. Typical examples are water, alcohols, aqueous salt solutions, etc.

It is often beneficial to control the temperature of the coagulation media in order to achieve desired properties in the highly asymmetric Porous hollow fibers produced by this invention. The temperatures of the coagulation baths are usually from about $-10°$ C. to 100° C. and more frequently from about 10° C. and 60° C. After being thus solidified, the formed asymmetric porous hollow fibers may be taken up or collected by any suitable means. Collection rates are typically in the range of about 15 meters per minute to about 300 meters per minute and more frequently in the range of about 20 meters per minute to about 150 meters per minute. The asymmetric porous hollow fibers may be then optionally exposed to one or more final washing stages to remove any residual solvent or nonsolvent components. Suitable washing liquids can include any material that is miscible with the solvent or nonsolvent components to be extracted, but at the same time is not harmful to the formed asymmetric porous hollow fiber.

Advantageously, the walls of hollow fibers are sufficiently thick that no special apparatus is required for their handling. Frequently, the hollow fibers may have outside diameters of about 20 to 1,000 microns, say about 50 to 1,000, e.g., about 250 to 1,000 microns, and have walls of at least about 5 microns in thickness. The wall thickness in some hollow fibers may be up to about 200 or 300 microns. In order to provide desirable fluxes through the hollow fibers the hollow fibers may have a substantial void volume. Voids or pores are regions within the walls of the hollow fibers which are vacant of the material of the hollow fibers. Thus, when voids are present, the density of the hollow fiber is less than the density of the bulk material of the hollow fiber. Often the void volume of the hollow fibers is up to about 90, say about 10 to 80, and sometimes about 20 or 30 to 70 percent, based on the superficial volume, i.e., the volume contained within the gross dimensions, of the hollow fiber. Frequently, the pores have an average cross-sectional diameter less than about 20,000 Angstroms and, in some hollow fibers, the diameter is less than about 1,000 or 5,000 Angstroms. The hollow fiber of this invention is characterized by having at least one relatively dense region within its thickness in barrier relationship to fluid flow through the wall of the hollow fiber, i.e., the hollow fiber is anisotropic or asymmetric. The dense region is typically the exterior surface of the hollow fiber membrane, but can be located in the interior, particularly in the region adjacent to the surface.

The process of this invention is most useful for the preparation of highly asymmetric integrally skinned membranes for gas separation wherein material of the membrane substantially effects the separation. Such membranes contain nonporous dense regions within the membrane structure that are typically located at the membrane surface. These dense regions, or surface layers, are preferably nonporous or of extremely low porosity typically below $10^{-5}$, preferably below $10^{-6}$. Surface porosity is defined as a ratio or surface area occupied by pores to the total surface area of the membrane. For asymmetric hollow fibers utilized for gas separations wherein the material of the hollow fiber effects a significant portion of the separation, the relatively dense region that effects the separation is not necessarily located at the exterior surface of the hollow fiber, but can be situated somewhat away from the surface sandwiched between porous nondiscriminating regions. "Asymmetric" as used herein refers to a membrane that comprises a thin dense discriminating region and one or more porous layers which provided little resistance to gas flow.

Typical examples of the types of polymers useful for forming the hollow fibers by this invention are any of the solid natural or synthetic fiber-forming substances. The selection of the material for the hollow fiber may be based on the heat resistance, solvent resistance, and/or mechanical strength of the hollow fiber, as well as other factors dictated by the intended separation process in which it will be used and the conditions to which it will be subjected. Thus, for instance, the selection of the material of the hollow fiber may be based on whether or not the material of hollow fiber is intended to significantly effect the gas separation, in which event the material of the hollow fiber must have useful separation properties; or whether the intended use of the hollow fiber is as a substrate for composite membrane preparation wherein the coating is intended to effect the gas separation. The hollow fibers may be flexible or substantially rigid. In the case of polymers, both addition and condensation polymers that can be fabricated in any suitable manner to provide porous hollow fibers are included. Typical polymers can be substituted or unsubstituted polymers and may be selected from polysulfones; poly(styrenes), including styrene-containing copolymers such as acrylonitrile-styrene copolymers; polycarbonates; cellulosic polymers, such as cellulose acetate; cellulose-acetate-butyrate, cellulose propionate, ethyl cellulose, methyl cellulose, etc.; polyamides and polyimides; polyethers; poly(arylene oxides) such as poly(phenylene oxide) and poly(xylylene oxide); polyurethanes; polyesters (including polyarylates); poly(alkyl methacrylates), poly(alkyl acrylates); polysulfides; polymers from monomers having alpha-olefinic unsaturation; and copolymers, grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups; sulfonic groups, and the like.

It was further found that the process of this invention is beneficial for manufacturing of substrates for composite membrane preparation. The composite membranes are typically prepared by depositing a thin membrane layer on an appropriate porous substrate, wherein the deposited layer provides the gas separation medium and the substrate that can be substantially asymmetric series primarily as the support layer. Substrate surface porosity useful for composite membrane preparation is frequently high and sometimes can be above several percent. Substrates for composite membrane manufacturing when prepared by the method of present invention frequently exhibit more uniform and sharp pore size distribution than membranes prepared by methods of prior art. Surfaces of these substrate materials produced by the method of this invention further appear substantially smoother and defect free, which allows for deposition of thinner defect-free gas separation barrier layer. The substrate surface layer region is frequently of a significantly reduced thickness as compared with the surface layer region of the prior art membranes. This, in turn, minimizes the interference of the substrate layer material with the gas separation characteristics of the final composite membrane. The thickness of the surface layer region of the substrates of this invention is frequently below 1,000 Ångstroms, typically below 500 Ångstroms, preferably below 400 Ångstroms and most advantageously below 300 Ångstroms. Consequently, composite membranes can be prepared from substrates of this invention that frequently exhibit improved gas separation/permeation characteristics.

The composite membranes that utilize the improved hollow fiber substrates produced by the method of this invention can be formed by any method known in the art, e.g., by solution deposition, plasma polymerization, interfacial polymerization, etc.

The specific membrane-forming material applied to the surface of the highly asymmetric porous hollow fiber membranes of this invention to produce the composite membrane will depend upon the particular gas separation process.

Typical of useful membrane-forming materials, which can be substituted or unsubstituted, one can mention synthetic rubbers; natural rubbers; relatively high molecular weight and/or high boiling liquids; organic prepolymers; poly(siloxanes) (silicone polymers); polyurethanes; polyamines: polyimides: polyamides; acrylonitrile-containing copolymers; polyesters; polycarbonates; cellulosic polymers, such as ethyl cellulose, cellulose acetate; blends of cellulose polymers, such as cellulose acetate/polymethyl methacrylate blends; polysulfones, especially modified polysulfones such as sulfonated polysulfones; poly(aklylene glycols) such as poly(ethylene glycol), poly(propylene glycol), etc.; polymers from monomers having $\oplus$-olefinic unsaturation such as poly(olefins), e.g., poly(4-methylpentane), poly(styrene) including Poly(styrene copolymers), polyvinyls; poly(arylene oxides), e.g., poly(xylyene oxide); poly(arylene oxides) modified by halogenation or sulfonation; polycarbonates; and the like.

As indicated previously, the membrane-forming material is frequently applied to the surface of the porous substrate from a solution, the film-forming solution. This is generally performed by passing the porous substrate surface through the solution. Any suitable solvent or mixture of solvents for the membrane-forming material can be used and those skilled in the art appreciate and know which solvent composition is suitable for a particular membrane-forming material/hollow fiber substrate combination. The solvent is one which will dissolve the membrane-forming material and can be inorganic or organic and able to produce a homogeneous or uniform solution. The solvent used to prepare the solution of the membrane-forming material can also be a mixture of one or more solvents that will dissolve the membrane-forming material and one or more nonsolvent for the membrane-forming material. The solution should wet the surface of the porous substrate and be of a low enough viscosity that it will be easily applied as an even coating. The viscosity at application temperature can vary from less than about 50 centipoise and is generally from about 0.5 to about 10 to 20 centipoise. The concentration of membrane-forming material in the membrane-forming solution can vary from about 0.25 to about 10 percent by weight of said solution.

Illustrative of solvents that can be used to prepare the solutions are the liquid aliphatic and aromatic hydrocarbons, e.g., toluene, pentane, hexane, 2-ethylhexane, cyclopentane, methylcyclopentane, cycloexane, etc.; alkanols, e.g., methanol, ethanol, the propanols, cyclohexanol, etc.; ketones, e.g., acetone, dimethyl ketone, methyl ethyl ketone, etc.; acids, e.g. acetic acid, propionic acid, etc.; water; esters, e.g., ethyl acetate, etc.; halogenated alkanes and dialkyl ethers; and the like; mixtures thereof may also be used. In some instances, one of said materials in the mixture may be the solvent for the membrane-forming material while the other of said materials may be the nonsolvent; in other instances both components may be solvents for the membrane-forming material.

The thin membrane applied to the surface of the asymmetric porous hollow fibers produced by the vacuum process of this invention can vary in thickness from about 500 Angstroms or less to about 7,000 Angstroms or more, preferably from about 500 Angstroms to about 2,000 Angstroms; this is not a critical factor of this invention.

The discovery that one could produce highly asymmetric porous hollow fibers having generally improved properties by subjecting the liquid hollow fiber exiting the spinneret orifice to a reduced pressure in a gaseous gap or vacuum chamber before it came into contact with the coagulation bath was completely unexpected and could not be predicted.

Experimental Details

Hollow fibers reported in the examples were spun by the dry-wet spinning method. Fully degassed (deaerated) spinning solutions (dopes) were delivered at rates of 1 to 10 ml/min. to a tube-in-orifice type spinneret (typical orifice diameter of 0.15 cm and injection tube outside diameter of 0.1 cm). Fluids injected into the fiber lumen were solvent-nonsolvent mixtures, mild swelling solvents, water, or gas, such as air. The temperature of the spinning solution was carefully monitored and maintained at a particular temperature between 20° to 120° C., as specified in the examples. The experimental setup for dry-wet spinning of hollow fibers under conditions of reduced pressure was similar to that described by Stoy et al. in U.S. Pat. No. 3,842,151. The height of the water column in the spinning apparatus determined the level of the vacuum in the gap between the spinneret and the coagulation bath. Provisions were made for water recirculation in the column. The gap size in the reduced pressure chamber or the distance that fibers travel between the spinneret and the coagulation bath could be varied between 0.1 and up to 50 cm in the experimental setup. The nascent hollow fibers were taken up at a rate of up to 100 m/min. The coagulation bath was water with the coagulation bath temperature maintained at ambient temperature or up to 60° C. in some experiments. The coagulated nascent hollow fibers were further washed in a water bath followed by an alcohol/water wash and dried prior to further use. The dried hollow fibers were evaluated for their gas separation characteristics. Typical fiber dimensions were about 0.038 cm OD and 0.02 cm ID.

Hollow Fiber Coating

Composite membranes were prepared from hollow fibers by conventional methods that essentially comprised passing hollow fibers through a dilute polymer solution followed by drying.

Asymmetric membranes of low surface porosity were coated with 1% polydimethyl siloxane (Sylgard/) in cyclohexane to convert them into multicomponent membranes essentially as taught in U.S. Pat. No. 4,230,463. The gas separation properties of these membranes were determined in principle by the material of the asymmetric membrane as opposed to the material of the coating.

Gas Permeation Measurements

The oxygen and nitrogen permeation rates and separation factors were determined by conducting an air separation at 700 kPag and room temperature condition at close to 0% stage cut. The permeation rates were determined using a mass flow meter and oxygen concentration in the gas stream was measured with an oxygen analyzer. The gas permeation rates, P/t, are reported in cm3/cm2•cmHg•sec; the separation factor, $\alpha$, between a gas pair is the ratio of their permeation rates.

The following examples serve to further illustrate the invention; parts are by weight unless otherwise indicated.

EXAMPLE 1

Preparation of Composite Polysiloxane Membrane

Part A. A homogeneous solution was prepared by stirring 41 parts of N-methyl pyrrolidone, 15.6 parts of surfactant Triton ® X-100 and 4.9 parts of glycerine. To this solution 38.5 parts of polysulfone (Udel ® P-3500) were gradually added and the mixture stirred at about 75° C. until complete polymer dissolution. The polysulfone solution was filtered and spun through a tube-in-orifice spinneret to produce the nascent hollow fiber. The spinneret was completely enclosed in a vacuum chamber in which the vacuum level was maintained at about 14 cm Hg. The spinning dope was extruded through the spinneret at a temperature of 93° C. while a stream of nitrogen was delivered through the bore of the injection tube to produce a hollow filament stream in the vacuum chamber. The hollow filament stream traveled through the vacuum chamber for a distance of about 10 cm and then coagulated in water maintained at 40°–45° C. and collected at a rate of about 61 meters per minute. The hollow fiber was water-washed and dried.

Module A. Composite hollow fiber membrane modules were prepared by coating the washed and dried polysulfone hollow fibers produced above with a 6% solution of polydimethylsiloxane (Sylgard ®) in cyclohexane, followed by a drying step to remove the solvent. Composite polysulfone hollow fiber modules containing 8 hollow fibers about 40.5 cm long were prepared by potting loops of fiber in a test module. These composite membranes modules were tested for air separation and the results are summarized in Table I.

Part B. For comparative purposes the spinning dope described in Part A was used to spin hollow fibers under conditions similar to those described in Part A with the exception that the spinneret was not enclosed within a vacuum chamber, but rather was kept at ambient atmospheric pressure. All other spinning, collecting and drying conditions were essentially the same as in Part A.

Module B.

Module B was produced following the procedure used to produce Module A.

TABLE I

| (Ex. 1) | | |
|---|---|---|
| Module | A | B |
| Permeation rate,* P/t $O_2 \times 10^5$ | 14.0 | 11.2 |
| Separation factor, $\alpha$, $O_2/N_2$ | 2.3 | 2.4 |

*in $cm^3/cm^2 \cdot cmHg \cdot sec$

The data in Table I show that the oxygen permeation rate for the composite membrane Module A prepared from the polysulfone hollow fiber substrate spun by the vacuum process of this invention is 25% higher than the oxygen permeation rate for the composite membrane Module B prepared from the substrate hollow fibers spun at ambient atmospheric conditions with essentially the same separation factor. The large increase in permeation rate achieved was unexpected and could not be predicted.

EXAMPLE 2

Preparation of Asymmetric Polysulfone Membrane

Part A. A spinning dope was prepared according to the procedure described in Example 1 except that the composition of the solution in this Example was 37 parts by weight of polysulfone, 7.35 parts by weight of citric acid and 55.65 parts by weight of N-methyl pyrrolidone.

The deaerated spin dope wa filtered and delivered under pressure to a tube-in-orifice spinneret having an orifice diameter of about 0.1 cm and an injection tube outside diameter of about 0.05 cm. The spinneret was completely enclosed in a vacuum chamber in which the vacuum level was 14 cm Hg. The spinning dope was extruded at a temperature of 71° C. from this spinneret while a bore fluid consisting of 91% V/V N-methyl pyrrolidone/water was delivered through the core of the injection tube to produce a nascent hollow filament stream. This hollow filament stream traveled through the vacuum chamber for a distance of 1.27 cm into a coagulation bath consisting essentially of water at approximately 25° C. The coagulated filament was then run through a coagulation bath consisting essentially of water at 25° C. and subsequently collected at a rate of 30.5 meters per minute. The washed and dried hollow fiber had an outside diameter of 0.0378 cm and an inside diameter of 0.02 cm.

Module C. Asymmetric polysulfone hollow fiber modules containing 8 fibers about 30.5 cm long were prepared by potting loops of fibers produced in Part A of this Example in a test module and coating the fibers with a 1% solution of Sylgard ®. The air separation rates are summarized in Table II.

Part B. For comparative purposes, the spinning dope described in Part A was spun at normal atmospheric pressure conditions. All other spinning conditions were maintained essentially as described in Part A.

Module D. Following the procedures described for Module C, asymmetric polysulfone hollow fibers of Part B of this Example were used to prepare modules. They were tested and the results are summarized in Table II.

TABLE II

| (Ex. 2) | | |
|---|---|---|
| Module | C | D |
| Permeation rate,* P/t $O_2 \times 10^5$ | 2.7 | 2.2 |
| Separation factor, $\alpha$, $O_2/N_2$ | 5.33 | 5.22 |

*in $cm^3/cm^2 \cdot cmHg \cdot sec$

The data in Table II show that the asymmetric polysulfone hollow fiber membranes, Module C, prepared with the hollow fibers spun by the vacuum process of this invention had an oxygen permeation rate 20% greater compared to the asymmetric polysulfone hollow fiber membrane Module D, prepared using the hollow fibers spun at ambient atmospheric conditions.

EXAMPLE 3

Preparation of Asymmetric Polyetherimide Membrane

Part A. A spinning dope was prepared following the procedure described in Example 1 except that the solution was comprised of 38.5 parts by weight of polyetherimide polymer (Ultem ®), 18.45 parts by weight of N-methyl pyrrolidone, and 43.05 parts by weight of gamma-butyrolactone.

The spinneret was completely enclosed in a vacuum chamber in which the vacuum level was 14 cm Hg. The spinning dope was extruded at a temperature of 94° C. while a bore fluid of N-methyl pyrrolidone was delivered through the core of the injection tube to produce the nascent hollow filament stream. This hollow filament stream traveled through the vacuum chamber for a distance of 5.1 cm and then entered a coagulation bath consisting essentially of water at 42° C. The coagulated filament was then run through a coagulation bath consisting essentially of water at a temperature of 46° C. and subsequently collected at 67.1 meters per minute. The hollow fiber was water-washed and dried.

Following the procedures described for Module A, modules comprised of asymmetric polyetherimide hollow fibers of Part A of this Example were prepared and tested. The results are summarized in Table III.

Part B. For comparative purposes, the spinning dope used in Part A of this Example was used to spin hollow fibers under conditions similar to those in Part A with the exception that the spinneret was not enclosed in a vacuum chamber, but rather was at ambient atmospheric pressure.

Module F. Following the procedures described for Module E, modules comprised of the asymmetric polyetherimide hollow fibers of Part B of this Example were prepared and tested. The results are summarized in Table III.

TABLE III

| | (Ex. 3) | |
|---|---|---|
| Module | E | F |
| Permeation rate,* P/t $O_2 \times 10^5$ | 0.81 | 0.65 |
| Separation factor, a, $O_2/N_2$ | 6.37 | 3.41 |

*in $cm^3/cm^2 \cdot cmHg \cdot sec$

The data in Table III show that the asymmetric hollow fiber membrane Module E prepared with the polyetherimide hollow fibers spun by the vacuum process of this invention had an oxygen permeation rate 25% higher than the Module F prepared with the hollow fibers spun at ambient atmospheric pressure. In addition, Module E had a significantly higher $O_2/N_2$ separation factor than Module F. These results were completely unexpected and could not be predicted.

What is claimed is:

1. A process for separating a first gaseous component from a mixture thereof with at least one other gaseous component which comprises:
    1) contacting said mixture with a highly asymmetric gas separation hollow fiber membrane prepared by the process that comprises:
        a) forming a mixture of fiber-forming polymer and at least one solvent, said polymer being capable of affecting separation of the first gaseous component from said at least one other gaseous component;
        b) extruding the polymer-solvent mixture in the form of a hollow fiber into a gaseous atmosphere maintained at a subatmospheric pressure;
        c) conveying into and solidifying the polymer-solvent mixture in a liquid medium;
        d) washing the solidified polymer; and
        e) recovering a solidified highly asymmetric hollow fiber membrane; and
    2) recovering the component of said mixture passing selectively through the solidified highly asymmetric hollow fiber membrane; and
    3) separately recovering the component of said mixture not passing selectively through the solidified highly asymmetric hollow fiber membrane.

2. A process as claimed in claim 1 wherein said highly asymmetric gas separation hollow fiber membrane was treated to block residual imperfections.

3. A process as claimed in claim 1 wherein said first gaseous component is oxygen.

4. A process as claimed in claim 1 wherein said first gaseous component is hydrogen.

5. A process for separating a first gaseous component form a mixture hereof with at least one other gaseous component which comprises;
    1) contacting said mixture with a composite gas separation membrane comprising a thin layer of gas separation material that substantially determines the gas separation characteristics of said composite gas separation membrane, said thin layer deposited on the surface of a highly asymmetric porous hollow fiber substrate such that said thin layer is less than about 400 Å thick, said highly asymmetric porous hollow fiber substrate produced by:
        a) extruding a solution of a fiber-forming polymer through a spinneret into a vacuum chamber containing a gaseous medium maintained at subatmospheric pressure,
        b) thereafter passing the solution of a fiber-forming polymer extruded through the spinnet into a liquid bath to solidify the hollow fiber,
        c) washing the solidified fiber, and
        d) recovering a solid highly asymmetric hollow fiber;
    2) recovering the component of said mixture passing selectively through the thin layer of gas separation material; and
    3) separately receiving the component of said mixture not passing selectively through the thin layer of gas separation material.

6. A process as claimed in claim 5 wherein said composite gas separation membrane was treated to block residual imperfections.

7. A process as claimed in claim 5 wherein said gas mixture comprises oxygen and nitrogen.

8. A process as claimed in claim 5 wherein said first gaseous component comprises hydrogen.

9. A highly asymmetric gas separation hollow fiber membrane prepared by the process comprising:
    a) forming a mixture of fiber-forming polymer and at least one solvent;
    b) extruding the polymer-solvent mixture in the form of a hollow fiber into a gaseous atmosphere maintained at a subatmospheric pressure;
    c) conveying into and solidifying the extruded polymer-solvent mixture in a liquid medium;
    d) washing the solidified fiber; and
    e) recovering the solidified highly asymmetric hollow fiber membrane.

10. A highly asymmetric gas separation hollow fiber membrane as claimed in claim 9 wherein said hollow fiber membrane has a gas separation barrier layer less than about 1,000 Å thick.

11. A highly asymmetric gas separation membrane as claimed in claim 10 wherein said gas separation barrier layer is less than about 400 Ångstroms thick.

12. The highly asymmetric membrane of claim 9 wherein the membrane has a surface porosity of below $10^{-5}$.

13. The highly asymmetric membrane of claim 12 wherein said asymmetric membrane is further subjected to an annealing step.

14. The highly asymmetric membrane of claim 12 and including coating the asymmetric membrane with a high gas permeability polymer.

15. The highly asymmetric membrane of claim 14 wherein the high permeability polymer is polysiloxane.

16. The highly asymmetric membrane of claim 9 wherein said asymmetric membrane is treated to block residual imperfections.

17. The highly asymmetric membrane of claim 9 wherein the highly asymmetric membrane is prepared from a mixture of a fiber-forming polymer, and a mixture of a solvent and at least one nonsolvent for said polymer.

18. The highly asymmetric membrane of claim 17 wherein the highly asymmetric membrane is prepared from a mixture of high boiling and low boiling solvents.

19. The highly asymmetric membrane of claim 9 wherein the highly asymmetric membrane is prepared form a mixture of a fiber-forming polymer, and a mixture of at least two solvents and at least one nonsolvent for said polymer.

20. A composite gas separation membrane comprising a thin layer of gas separation material that substantially determines the gas separation characteristics of said composite gas separation membrane, said gas separation material deposited on the surface layer of a highly asymmetric porous hollow fiber substrate wherein the surface layer region of said asymmetric porous hollow fiber substrate is less than about 400 Å thick, said highly asymmetric porous hollow fiber substrate produced by extruding a solution of a fiber-forming polymer through a spinneret into a vacuum chamber containing a gaseous medium maintained at subatmospheric pressure, thereafter passing the solution of a fiber-forming polymer extruded in the spinneret into a liquid bath to solidify hollow fiber, washing the solidified fiber and recovering a highly asymmetric hollow fiber substrate.

21. A composite gas separation membrane as claimed in claim 20 wherein the highly asymmetric porous hollow fiber substrate has a surface layer region of less than about 300 Å thick.

22. A composite gas separation membrane as claimed in claim 20 wherein said gas separation material is a polydimethylsiloxane.

23. A composite gas separation membrane as claimed in claim 20 wherein said gas separation material is a cellulosic derivative polymer or a blend thereof.

24. A composite gas separation membrane as claimed in claim 20 wherein said gas separation material is cellulose acetate.

25. A composite gas separation membrane as claimed in claim 20 wherein said gas separation material is ethyl cellulose.

26. A composite gas separation membrane as claimed in claim 20 wherein said gas separation material is a blend of cellulose acetate and polymethyl methacrylate.

27. A composite gas separation membrane as claimed in claim 20 wherein said gas separation material is a derivative of polysulfone or polyphenylene oxide.

28. A composite gas separation membrane as claimed in claim 27 wherein said gas separation material is a sulfonated polysulfone.

29. A composite gas separation membrane as claimed in claim 27 wherein said gas separation material is a halogenated or sulfonated polyphenylene oxide.

30. A composite gas separation membrane as claimed in claim 20 wherein said gas separation material is a polyester or polycarbonate.

31. A composite gas separation membrane as claimed in claim 20 wherein said composite gas separation membrane is post-treated to block residual imperfections.

32. A composite gas separation membrane as claimed in claim 20 wherein said highly asymmetric porous hollow fiber substrate is prepared from a mixture of a fiber-forming polymer, and a mixture of solvent and at least one nonsolvent for said polymer.

33. A composite gas separation membrane as claimed in claim 32 wherein said nonsolvent is polyvinylpyrrolidone.

34. A composite gas separation membrane as claimed in claim 32 wherein said nonsolvent is a surfactant.

35. A composite gas separation membrane as claimed in claim 32 wherein said nonsolvent is a polyalkylarylpolyether alcohol.

36. A composite gas separation membrane as claimed in claim 32 wherein said nonsolvent is a polyhydric alcohol.

37. A process for forming highly asymmetric hollow fiber for gas separations comprising extruding a solution of a fiber-forming polymer through a spinneret into a vacuum chamber containing a gaseous medium maintained at subatmospheric pressure, and thereafter passing the extruded solution of a fiber forming polymer into a liquid bath to solidify the hollow fiber, washing the solidified fiber and recovering a highly asymmetric hollow fiber.

38. A process as claimed in claim 37 wherein the distance in the vacuum chamber between the spinneret face and said liquid bath is from about 0.25 cm to about two meters.

39. A process as claimed in claim 38 wherein the distance in the vacuum chamber is from about 0.5 cm to about 30 cm.

40. A process as claimed in claim 37 wherein said highly asymmetric hollow fiber has a gas separation barrier layer less than about 1,000 Å thick.

41. A process as claimed in claim 40 wherein said gas separation barrier layer is less tan about 400 Ångstroms thick.

42. A process as claimed in claim 40 and including post-treating said gas separation barrier layer to essentially block residual imperfections.

43. A process as claimed in claim 37 wherein the subatmospheric pressure in the vacuum chamber is from about 1 cm Hg to about 75 cm Hg.

44. A process as claimed in claim 43 wherein said subatmospheric pressure is from about 10 cm Hg to about 35 cm Hg.

45. The process of claim 37 wherein the temperature of the gaseous medium held at subatmospheric pressure and the temperature of said liquid bath are different.

46. The process of claim 37 wherein the temperature of said liquid bath is substantially lower than the temperature of said solution of fiber-forming polymer.

47. A process as claimed in claim 37 wherein said fiber-forming polymer is a polysulfone, a polyimide, a polyamide, a polycarbonate, a polyester, or a cellulosic derivative polymer.

48. A process as claimed in claim 47 wherein the distance in the vacuum chamber between the spinneret face and the liquid bath is from about 0.5 cm to about 30 cm and the subatmospheric pressure in the vacuum chamber is from about 10 cm Hg to about 35 cm Hg.

49. The process claimed in claim 37 and including depositing a coating on the surface of the recovered solid highly asymmetric hollow fiber.

50. The process claimed in claim 37 wherein the gas separation layer of said solid highly asymmetric hollow fiber is substantially non-porous.

51. The process claimed in claim 50 wherein said solid highly asymmetric hollow fiber is post-treated to substantially block residual imperfections in the gas separation layer.

* * * * *